United States Patent [19]
Nowak et al.

[11] Patent Number: 5,262,609
[45] Date of Patent: Nov. 16, 1993

[54] SELF-DIAGNOSING RESISTANCE WELDING CABLE AND METHOD

[75] Inventors: James L. Nowak, Howard City; Richard J. Balaguer, Ortonville; Jandane E. Christianson, Berrien Springs; Joe S. Worden, Algonac, all of Mich.

[73] Assignee: Balaguer Corp., Troy, Mich.

[21] Appl. No.: 911,823

[22] Filed: Jul. 10, 1992

[51] Int. Cl.⁵ ............................................. B23K 11/25
[52] U.S. Cl. ................................... 219/109; 324/543
[58] Field of Search ............... 219/109, 110; 324/539, 324/541, 542, 543, 544

[56] References Cited

U.S. PATENT DOCUMENTS

| | | | |
|---|---|---|---|
| 4,647,751 | 3/1987 | Yoshimura et al. | 219/109 |
| 4,973,813 | 11/1990 | Mitchell | 219/109 |
| 4,999,477 | 3/1991 | Yamaguchi et al. | 219/109 |

Primary Examiner—Clifford C. Shaw
Attorney, Agent, or Firm—Waters & Morse

[57] ABSTRACT

A self-diagnosing resistance welding cable and method for monitoring the relative increase in cable resistance while a cable is in use, without disconnecting the cable. The cable incorporates a reference resistor in one of the terminals in thermal communication with the cable, such that a comparison in resistance variation between the cable and reference resistor cancels the effects of temperature variation on resistance change. The reference resistor is connected in series with the cable in an electrical test circuit. The test data is sampled each time the welding machine is cycled, and the data is updated and processed by a computer on a continuous basis. The system also monitors the actual temperature of the cable and the flow of coolant through the cable. Multiplexer circuits are used to monitor multiple welding cables with the same computer.

9 Claims, 7 Drawing Sheets

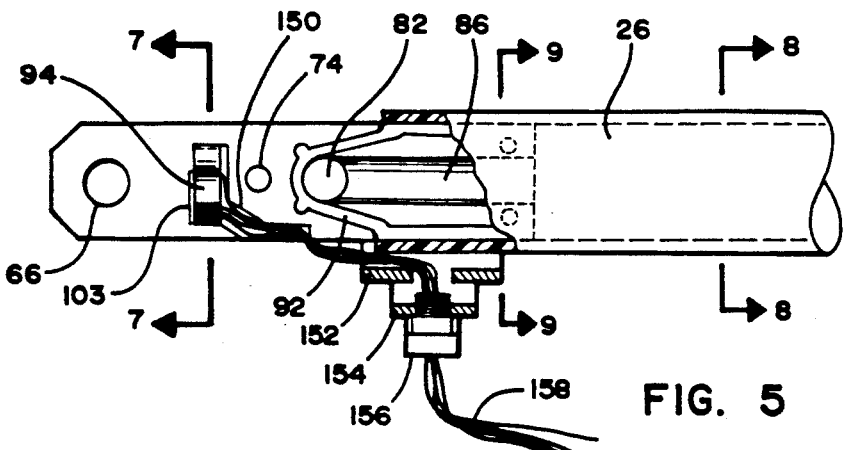
FIG. 5
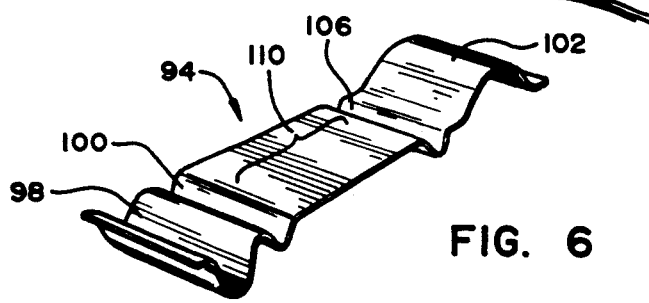
FIG. 6
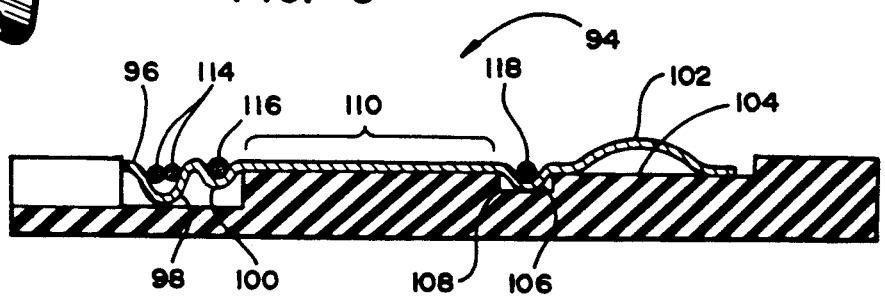
FIG. 7
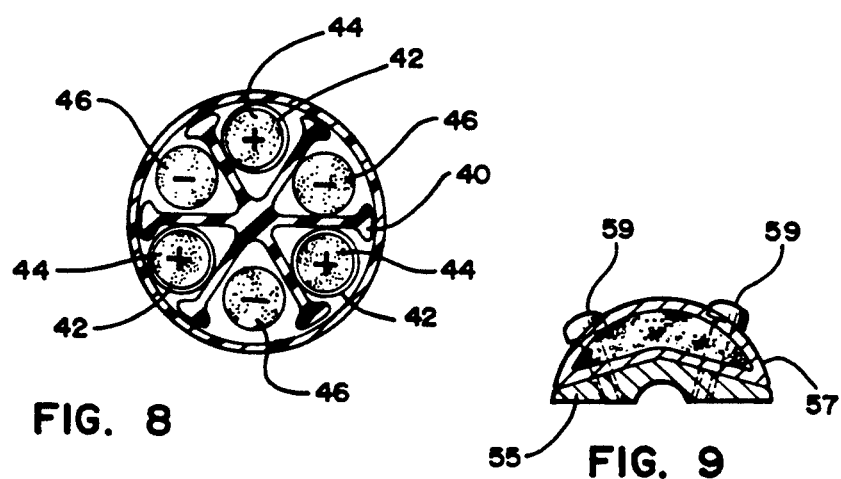
FIG. 8
FIG. 9

SELF-DIAGNOSING RESISTANCE WELDING CABLE AND METHOD

BACKGROUND OF THE INVENTION

In a resistance welding operation, a flexible cable formed of two or more stranded conductors is typically connected between a transformer and a welding gun having welding tips that close on opposite sides of a joint to be welded. A low voltage, high amperage electrical current (20 volts and 10,000 amps is typical) is passed through the cable and welding tips and through the joint to be welded. The high current causes fusion of the parts to be welded.

The high current through the welding cable produces a strong electromagnetic field around the cable. This magnetic field can cause a strong kick or jump in the cable. To avoid this, a cable called a "kickless cable" has been developed. This cable has a plurality of stranded conductors arranged symmetrically in a circular arrangement, with alternating conductors being positive and negative. Six conductors is a typical kickless cable arrangement. The juxtaposition of positive and negative conductors causes a cancellation in the electromagnetic fields and renders the cable "kickless".

Such cables usually are fluid cooled, with a typical cable being provided with water fittings in terminals at opposite ends of the cable, with water being pumped through one terminal and along the cable and exiting at the other terminal. The entire cable is usually covered with a waterproof jacket or sheath that encloses the conductors of the cable as well as providing a water course for cooling fluid.

In many resistance welding operations, the operation of the welding gun results in a continuous movement and flexing of the welding cable. Over time, this flexing causes the cable to work harden and also causes the fine strands of the conductors to break. This results in the cable gradually increasing in resistance over a period of time. Since the voltage in a resistance welding operation is relatively low and the current extremely high, it is essential that the resistance of the welding cable be maintained at a very low level. As the resistance increases, the amount of heat generated in the cable increases and the amount of current available for the welding tips of the welding gun reduces significantly. A drop in current eventually will produce an inferior weld.

Because of this, manufacturers usually have a predetermined time when welding cables are replaced. Some manufacturers replace a welding cable when the cable increases in resistance to 130% of its original resistance, while other companies replace cables when the resistance increases to 110% of its original resistance.

In order to determine when a cable has reached the point of replacement, the general practice is to shut down the welding line, disconnect the cable, and test the resistance of the cable. If the cable is satisfactory, the cable is reconnected and used until the next test period. If the resistance of the cable is found to be more than the predetermined percentage higher than the original cable resistance measured, the cable is replaced. The increase in cable resistance is dependent upon a number of factors, including temperature, the amount of flexing the cable has encountered, and the amount of use placed on the cable in the welding operation. Because of this, it is not possible to predict exactly when a cable is due for replacement.

An object of the present invention is to provide an improved method for testing cables and a self-diagnosing cable assembly, wherein the relative increase in resistance of a cable can be tested on the fly during cable operation, without disconnecting the cable from the welding apparatus.

SUMMARY OF THE INVENTION

The present invention comprises a method and apparatus for testing and making it possible to test a resistance welding cable assembly for resistance increase and other parameters without disconnecting it from a welding machine. The present invention is used in connection with a welding cable that comprises conductors having terminals affixed to opposite ends thereof, with the terminals serving as a means for connecting the cable between a current source and a resistance welding gun having welding tips. The cable assembly typically is a fluid cooled cable, wherein a fluid flows through an internal passage in the terminals and along the cable through a fluid-tight jacket on the cable.

In accordance with the present invention, the method and apparatus for continuously measuring the relative change in resistance of the cable over time comprises connecting a reference resistor to the cable assembly in such way that the reference resistor is in thermal communication with the fluid cooled cable so that the temperature of the reference resistor is affected by and representative of the temperature of the fluid cooled cable. A current source is connected across the reference resistor and cable and the relative resistance of the cable and reference resistor are measured at least periodically over the life of the cable. The relative resistance measurements are compared to determine a ratio between the resistances. The ratio of the resistances when the cable is new is used as a base value and is compared with subsequent changes in the ratio in order to determine the relative increase in resistance of the cable over the period of use of the cable. When the ratio increases to the point where it reflects an increase in cable resistance to a predetermined relative value over the base value, the cable is replaced. In the meantime, the measurements are taken without interrupting the use of the cable in the resistance welding operation.

In the present invention, a reading is taken and a ratio is calculated each time the welding gun is used, with the reading being taken after the welding tips open at the completion of the weld. The data thus produced not only provides data representative of the increase in resistance of the cable, but it also provides useful data relating to the operation of the welding gun, such as frequency of use and the like.

In the present invention, a separate temperature responsive resistor or thermistor is connected to the cable in order to provide an absolute reading of the temperature of the welding cable. Also, an electrical flow switch is employed to provide input data relating to the flow of cooling fluid through the cable. Both of these signals can be used to provide an alarm signal in the event that the absolute temperature of the cable increases beyond a given threshold limit or if the flow of cooling fluid through the cable stops. A cable may overheat to the point of disintegration in a very short period of time if coolant flow is interrupted, so a continuous electronic monitoring of cable temperature and cooling fluid presence is a desirable feature.

The electronic output signals of the present invention are transmitted to a computer in the form of a programmable logic controller ("PLC"). This can provide output data to a display terminal or a printer and it can also automatically actuate an alarm signal. The PLC output also can be connected through a data interface to a conventional computer. The computer can acquire the data and use the data for a number of manufacturing operations and decisions.

The controller is not limited to acquisition of data from a single set of welding tips. In the present invention, multiplex circuitry is employed so that a single PLC can gather data from a number of resistance welding machines at the same time, with multiplex circuitry being actuated by the tips open signal from each machine in order to cause an electronic test of the temperature and relative resistances and water flow for each cable once each time right after the welding gun is used.

These and other advantages and features of the present invention are described in detail below and shown in the attached drawings.

BRIEF DESCRIPTION OF THE DRAWINGS

FIG. 5 is a plan view of the tips end of the welding cable of the present invention, with the terminal being broken away to show the insulating plate thereof incorporating the reference resistor.

FIG. 6 is a perspective view of the reference resistor of the present invention.

FIG. 7 is a cross sectional view taken along line 7—7 of FIG. 5.

FIG. 8 is a cross sectional view taken along line 8—8 of FIG. 5.

FIG. 9 is a cross sectional view taken along line 9—9 of FIG. 5.

DETAILED DESCRIPTION OF PREFERRED EMBODIMENTS

Figure 1:
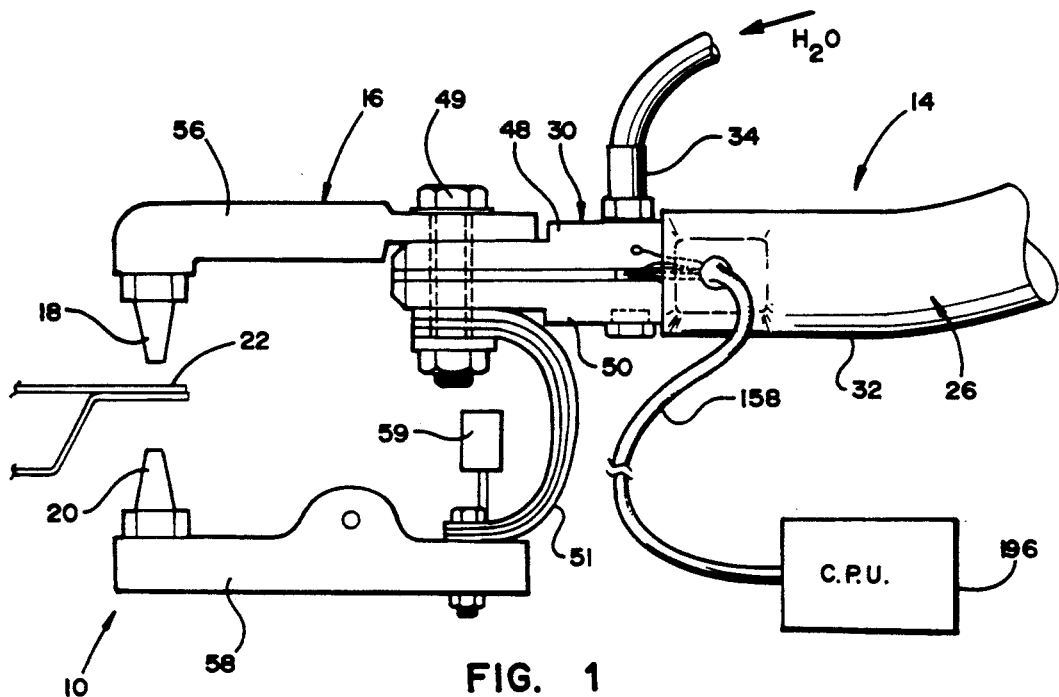
FIG. 1 is an elevational view showing one end of a cable constructed in accordance with the present invention connected to a welding gun of a resistance welding machine or apparatus.
Figure 2:
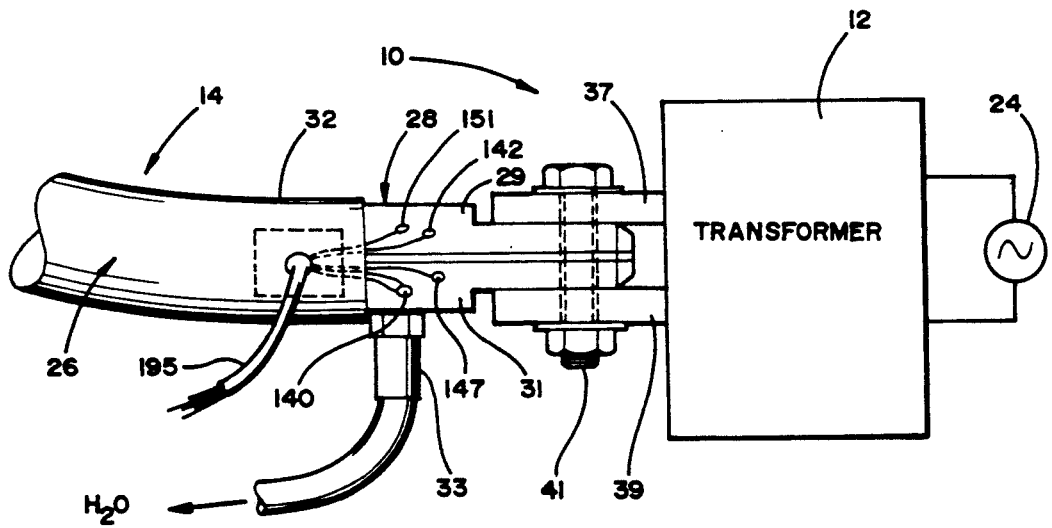
FIG. 2 is an elevational view showing the opposite end of the cable of FIG. 1 attached to the transformer of a resistance welding machine.

Referring to the drawings, resistance welding apparatus 10, shown in FIGS. 1 and 2, includes a transformer 12 connected to one end of a cable assembly 14 and a welding gun 16 connected to the other end of cable assembly 14. Welding gun 16 includes a pair of welding tips 18 and 20 that open and close on components 22 in order to make electrical contact between the tips.

Transformer 12 is connected to a conventional source of alternating current through a weld controller 24. The transformer produces a typical output voltage of about 20 volts and is capable of producing a current in excess of 25,000 amps.

Cable 14 comprises a multiconductor cable 26 having terminals 28 and 30 at the transformer end and tips end of the cable respectively. The cable portion 26 and a portion of the terminals is covered with a hose type cable jacket or sheath 32 that creates a water tight passage through the cable. A cooling fluid such as water is introduced in a fitting 34 at one end of the cable. This water flows through an internal opening in the terminal, cooling the terminal, and then flows along the interior of the cable 26 and then out through an outlet fitting 33 in terminal 28 at the transformer end of the cable. While a liquid cooled cable is employed in the preferred practice of the present invention, air cooled cables are known.

The cable employed in the preferred practice of the present invention is a so-called kickless cable shown in cross section in FIG. 8. The kickless cable includes an even number of stranded copper conductors (six typically) arranged in a circular cross sectional pattern, with the conductors being separated by a rubber insulating spline 40. Three of the conductors are enclosed with individual insulating jackets 42 at the ends. These conductors carry current in one direction, while the other three conductors carry current in the opposite direction. While the designation positive and negative is a matter of convention, for purposes of reference the insulated conductors will be considered positive conductors 44, while the uninsulated conductors will be considered negative conductors 46. Each group of three conductors is covered by a copper sheath 57 and connected by screws 59 to halves 48 and 50 at beveled flange 55 at each end of the cable.

Figure 3:
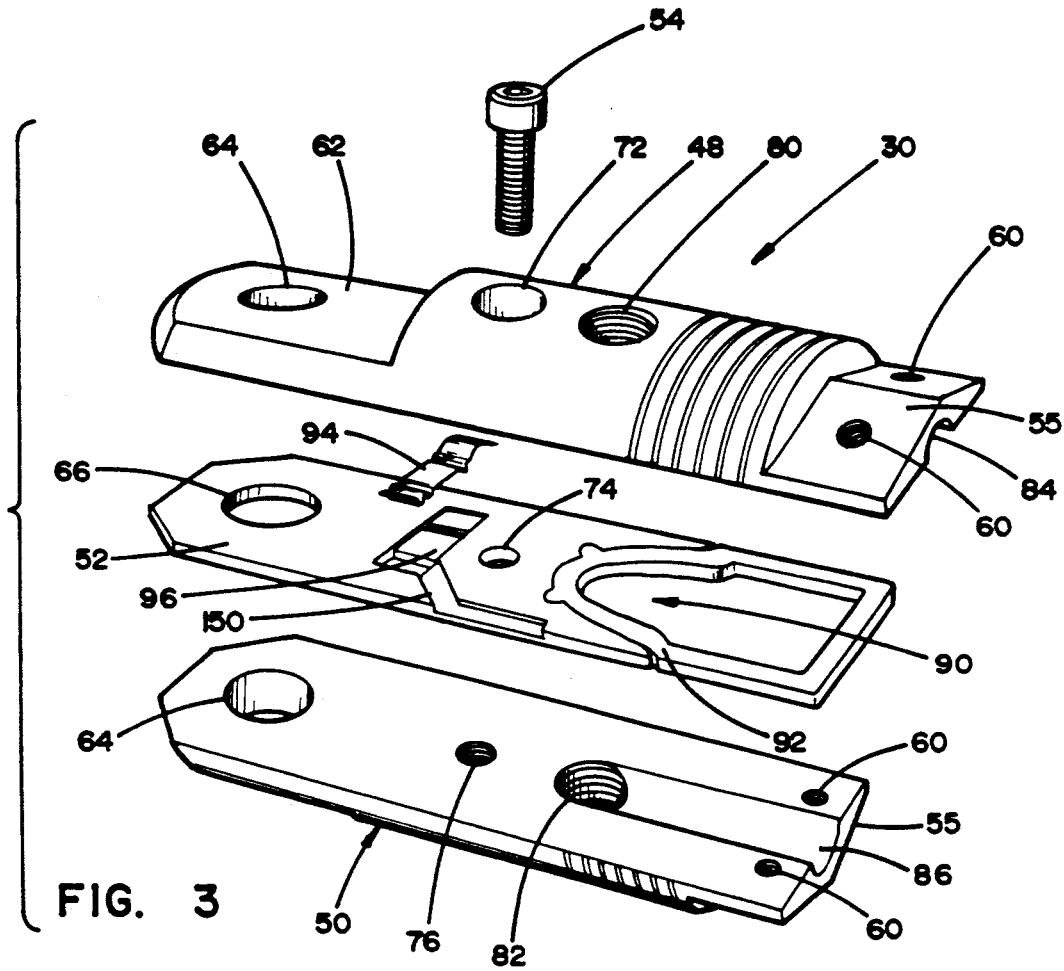
FIG. 3 is an exploded perspective view of a terminal for resistance welding cable, showing the manner in which the reference resistor of the present invention is incorporated in the terminal.

The construction of the terminals employed at the ends of the cable is shown in FIG. 3 in exploded fashion. With the exception of the test signal feature of the present invention, which is described below, the terminals at both ends are substantially the same and are conventional. Other conventional terminals could be used.

The terminal shown in FIG. 3 is the terminal 30 at the tips end of the cable. Terminal 30 is formed in two copper halves or sections 48 and 50, one section being a terminal connected to the positive cables and the other section being a terminal connected to the negative cables. The two terminals are separated by an non-conductive insulating plate 52 and bolted together by a bolt mechanism 54 which includes an insulating sheath and insulating washers (not shown) in a conventional fashion to insulate the bolt from the other terminal. Thus, the two sections of the terminal are electrically isolated.

As shown in FIG. 1, the tips end cable terminal is connected to the welding gun in a conventional manner. In the illustration, the terminal is attached to one welding arm 56 by means of an insulated bolt 49. Only section 48 is electrically connected to welding arm 56. Section 50 is electrically connected to a pivoting welding arm 58 by means of a flexible shunt 51, and is pivoted by air cylinder 59. Arm 56 is connected to welding tip 18 and arm 58 is connected to welding tip 20.

At the other end of the cable, as shown in FIG. 2, sections 29 and 31 of terminal 28 are connected to transformer junction plates 37 and 39, respectively, by insulated bolt 41.

Referring again to FIG. 3, each section of the terminal includes a flat outer end 62 having a bolt opening 64 therethrough. These bolt openings mate with each other and with the bolt opening 66 in the insulating plate. Insulated bolt 49 extends through these openings and clamps the arms 56 and 58 to the ends of the terminals.

Inward (to the right in FIG. 3) of the ends of the terminals, bolt openings 72, 74, and 76 extend through the upper terminal section, the insulating plate, and into the lower terminal section. These openings mate and are connected by bolt 54

To the right of the bolt openings are internally threaded cooling fluid openings 80 and 82 in the upper and lower terminal sections. These openings lead to the interior of the terminal and then are connected to mating, grooved passages 84 and 86 that extend to the inner or right hand end of the terminal. Either the upper or lower opening 80 or 82 may be plugged in operation (82 in this case), and a water inlet fixture is inserted in the other opening in order to provide water through the opening.

As shown in FIGS. 1 and 5, the inner end of the terminal has its outlet inside the sheathed cable. Thus, when water is introduced under pressure into opening 80, the water exits through the passage formed by grooves 84 and 86 into the interior of the cable. The water then flows along the cable inside the water tight sheath until it reaches a water outlet fixture 33 in the terminal 28 at the transformer end. Terminal 28 at the transformer end is substantially the same in these respects as the terminal at the tips end.

The right hand or inner end of the insulating plate 52 includes a U-shaped recess 90, with a rubber grommet 92 extending around the edge of the recess to seal the recess and prevent water from leaking between the sides of the insulating plate and the halves of the terminal.

The terminal thus far described is conventional. The significant feature is that water cools the terminal itself as well as the cable. With the cable being attached securely to the inner end of the terminal and the water cooling both, the temperature of the terminal adjacent to where the terminal is water cooled will essentially be the same temperature as the cable or at least a temperature that varies with and is representative of the temperature of the cable.

In accordance with the present invention, a reference resistor 94 is mounted in a recess 96 in the insulating plate 52 adjacent to the edge of opening 90 and separated from the opening 90 only by the bolt opening 74. As shown in FIGS. 6 and 7, reference resistor 94 has an inner end 95 having indentations 98 and 100 designed to accommodate wires 114 and 116 and a domed contact surface 102 at an outer end that extends upwardly from the recessed surface 104 of the insulating plate. An indentation 106 fits in a groove 108 in the insulating plate for mounting a wire 118 to the reference resistor. The portion 110 between wire indentations 100 and 106 constitutes the actual reference resistor portion of this element and can be covered with Teflon tape 103.

Reference resistor 94 desirably is formed of a copper strip about one inch long, one-quarter inch wide and about one-tenth inch thick. The reference resistance portion 110 is about one-half inch long and has a resistance of about fifty micro ohms.

An important aspect of the position of the reference resistor is that it is in contact with one of the halves of the terminal at a position in the terminal where the terminal receives the effect of the liquid cooling medium that flows through the terminal. Thus, the terminal at the position of the contact is representative of the temperature of the cable itself. This is important because the resistance of a conductor changes with the temperature of the conductor and by having the reference resistor mounted internally in the terminal in contact with a portion of the terminal having a temperature the same as or at least representative of the temperature of the cable, the temperature of the reference resistor will vary in direct relation with any variations in temperature of the cable. Thus, the same variations in resistance due to cable temperature will occur in the reference resistor and the cable, and the effect of such variations will be nullified in a comparison between the resistances of the two elements.

The reference resistor is connected in series with one of the terminal sections, section 48 in this case, and both resistors are connected in a circuit with a 5 volt DC power supply 121, which provides a signal voltage through the resistors. The power supply is connected to the reference resistor by a lead 114 that is connected to indentation 98 in the reference resistor. Test leads 116 and 118 are connected to the reference resistor at indentations 100 and 106. These test leads are connected to voltmeter 120 that measures the voltage drop across the reference resistor. This measurement is representative of the resistance of the reference resistor.

The other contacts for the test circuit of the present invention are connected to the terminals themselves. The test signal contacts are mounted on either the positive or negative sections, with only one terminal section being necessary to obtain a reading for determining a relative increase in cable resistance. Lead 118 is connected to the terminal by a fastener 120. The test current from power supply 121 first passes through lead 114 (which can be two thinner conductors instead of one larger conductor, if desired) and then passes through contact 102 into terminal section 48. Lead 118 extends in essence around the contact point and contact resistance between contact 102 and the surface of terminal section 48. This eliminates the effect of the contact resistance in the readings, as shown in FIG. 4.

Figure 10:
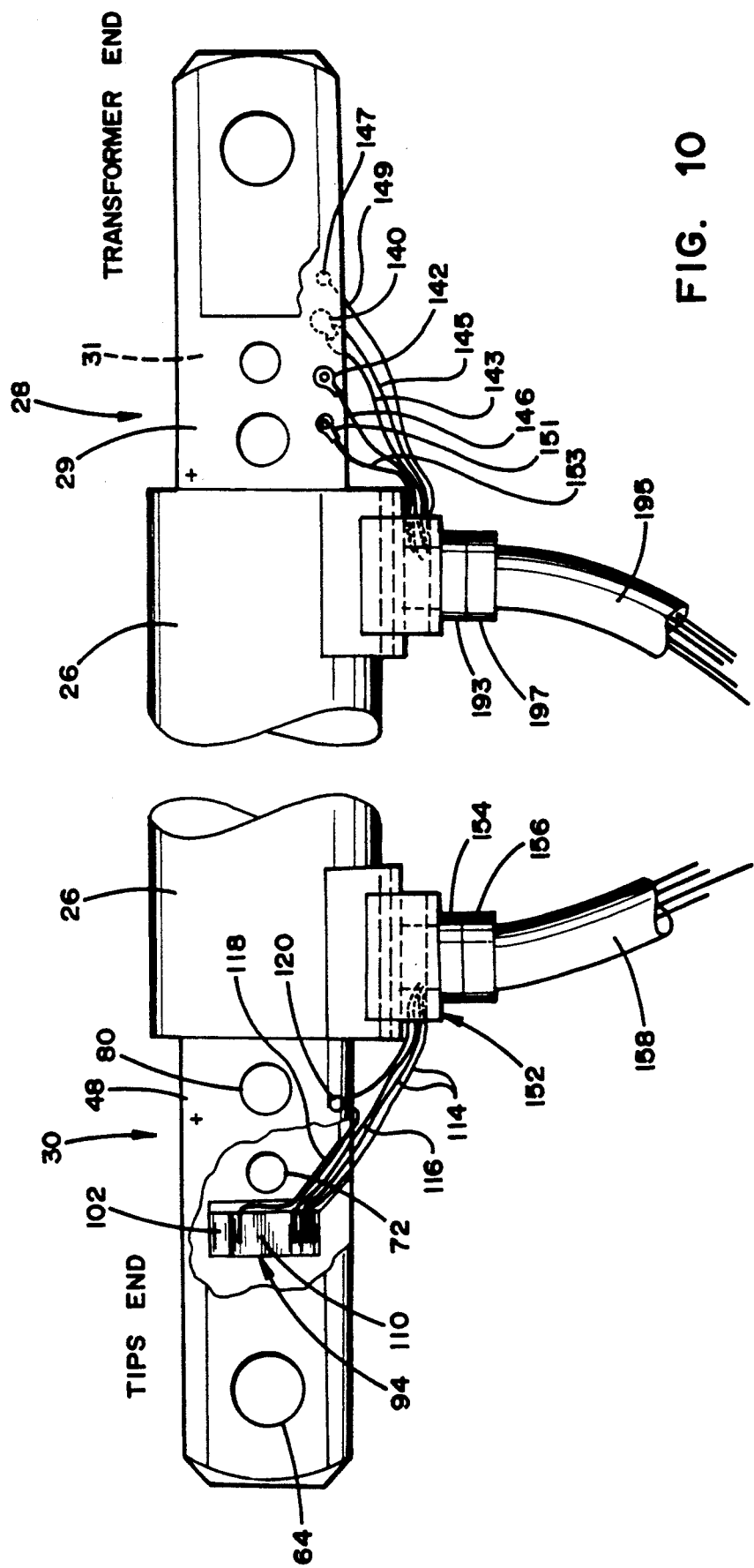
FIG. 10 is a pictorial plan view of the cable assembly of the present invention, showing the electrical connections to the cable assembly.
Figure 11:
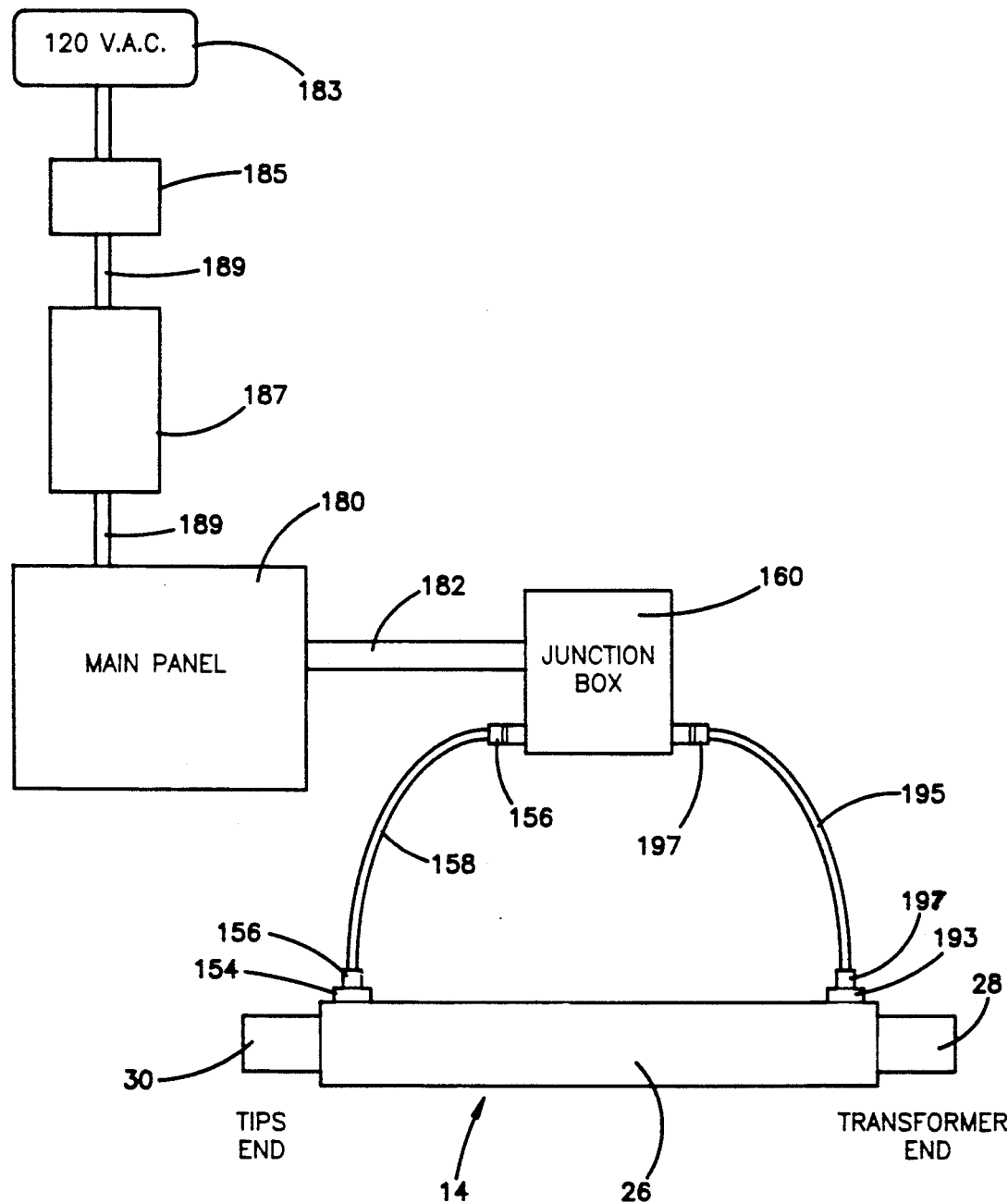
FIG. 11 is a schematic view showing the cable testing apparatus connected to a single welding cable.

Referring to FIG. 10, the elements attached to terminal 28 at the transformer end of the cable include a thermistor 140 attached directly to the negative terminal 31. Two leads 143 and 145 extend from the thermistor. A measurement contact 142 is mounted on positive terminal section 29 for measuring cable resistance. This terminal is connected by lead 146 to cable voltmeter 144, which measures the voltage drop and hence the resistance between the terminals 142 and 118. A short circuit terminal 147 and lead 149 are connected to negative terminal half 31. A short circuit detector is connected by this lead between positive and negative terminals of the cable to detect an incipient cable short circuit. A common terminal 151 for the power supply 121 is connected to transformer end terminal section 29. Lead 153 returns to the power supply.

Figure 4:
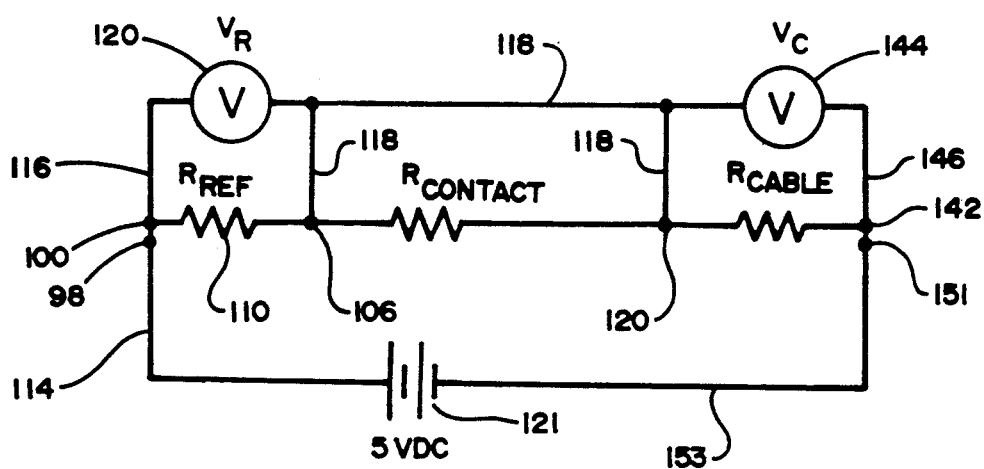
FIG. 4 is an electrical schematic view showing the manner in which the values of the reference resistor and the cable resistance are measured.

A schematic circuit diagram of the voltage measurement circuit is shown in FIG. 4. Voltmeter 120 measures the voltage drops across portion 110 of the reference resistor and volt meter 144 measures the voltage drop across the cable. This information is amplified then fed to a computer in the form of a programmable logic controller ("PLC") and used to calculate a ratio between the resistance of the cable and the resistance of the reference resistor. This data is collected and analyzed periodically in order to determine the increase in resistance of the cable over the use of the cable.

FIGS. 3 and 10 show how the test wiring is routed from the cable assembly. Leads 114, 116, and 118 extend through a groove 150 in the insulating plate and then exit from the terminal through a fitting 152 mounted on the side of the terminal. Fitting 152 can be covered with a shrink-tube sheath in order to maintain a water-tight fitting on the terminal. A pin type connector 154 attached to the fitting 152 is interconnected with a mating connector 156 on a wire harness 158 leading from the cable to a junction box 160.

Figure 12:
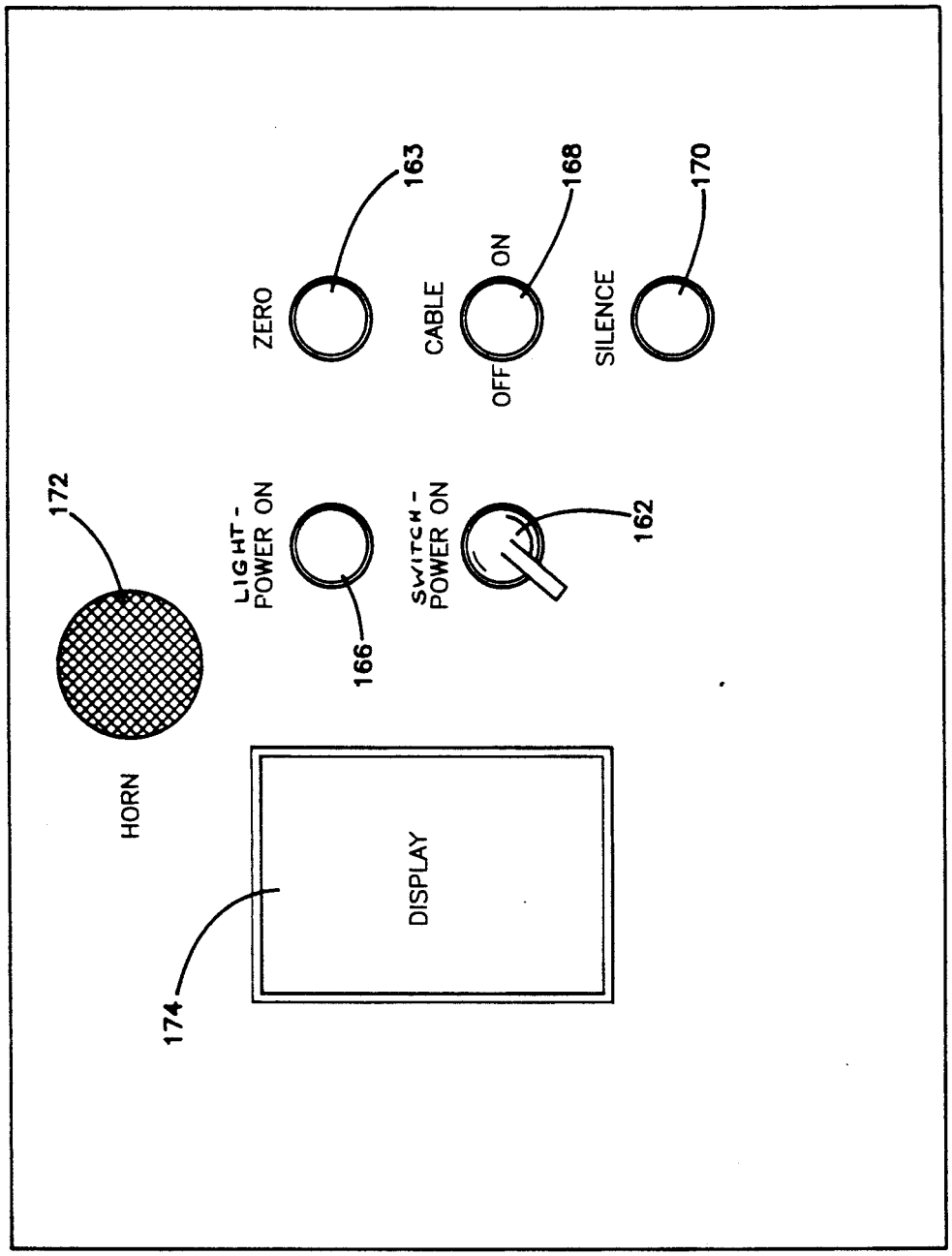
FIG. 12 is a pictorial view of the control and display panel of the present invention.

The electronic signals from the junction box are transmitted by a cable 182 to a main panel 180 containing the display and control knobs and buttons (see FIG. 12). These elements include a rotary switch 162 to turn the power on and a power light 166 indicating that the power is on. A push button switch 163 zeros out the cable when a new cable is installed. When this button is pushed, the ratio between the reference resistance and the cable resistance at that time is selected as the base factor for subsequent comparisons. A rotary switch 168 turns the cable voltage measuring apparatus on and off. A push button switch 170 is a mute switch that turns the horn off after an alarm is sounded. A horn 172 is positioned to emit an audible sound when a cable needs changing or when coolant flow through the cable stops or when the cable temperature reaches an undesirable critical point or upon reaching other alarm conditions. A visual display panel 174 can display a read out of any of the data that is collected by this apparatus. The visual display panel can be a simple LED panel that shows a warning light when an undesirable condition exists or the panel can be a liquid crystal or other display that displays a digital readout of the readings of the various conditions. The main panel houses the PLC, amplifier, power supply, multiplex module, fuses, and terminal connectors for interconnecting the various components to the test apparatus.

A 120 volt power supply 183 powers the main panel 180 through a 10 amp disconnect 185 and a mini-computer regulator 187, all of which are connected by cable 189 to the main panel.

The tips end of the cable, with its various connections, has a four pin receptacle, which is connected by cable 158 to the junction box, with four pin connectors 156 being on the ends of the cable. The connector at the transformer end of the cable is provided with a five pin receptacle 193, such that a cable 195 with five pin connectors 197 on opposite ends interconnect the transformer end of the cable assembly with the junction box. It is desirable that connectors having different pi configurations be used, so that one can always be sure that the proper signal cable connections are made at each end of the welding cable.

Figure 13:
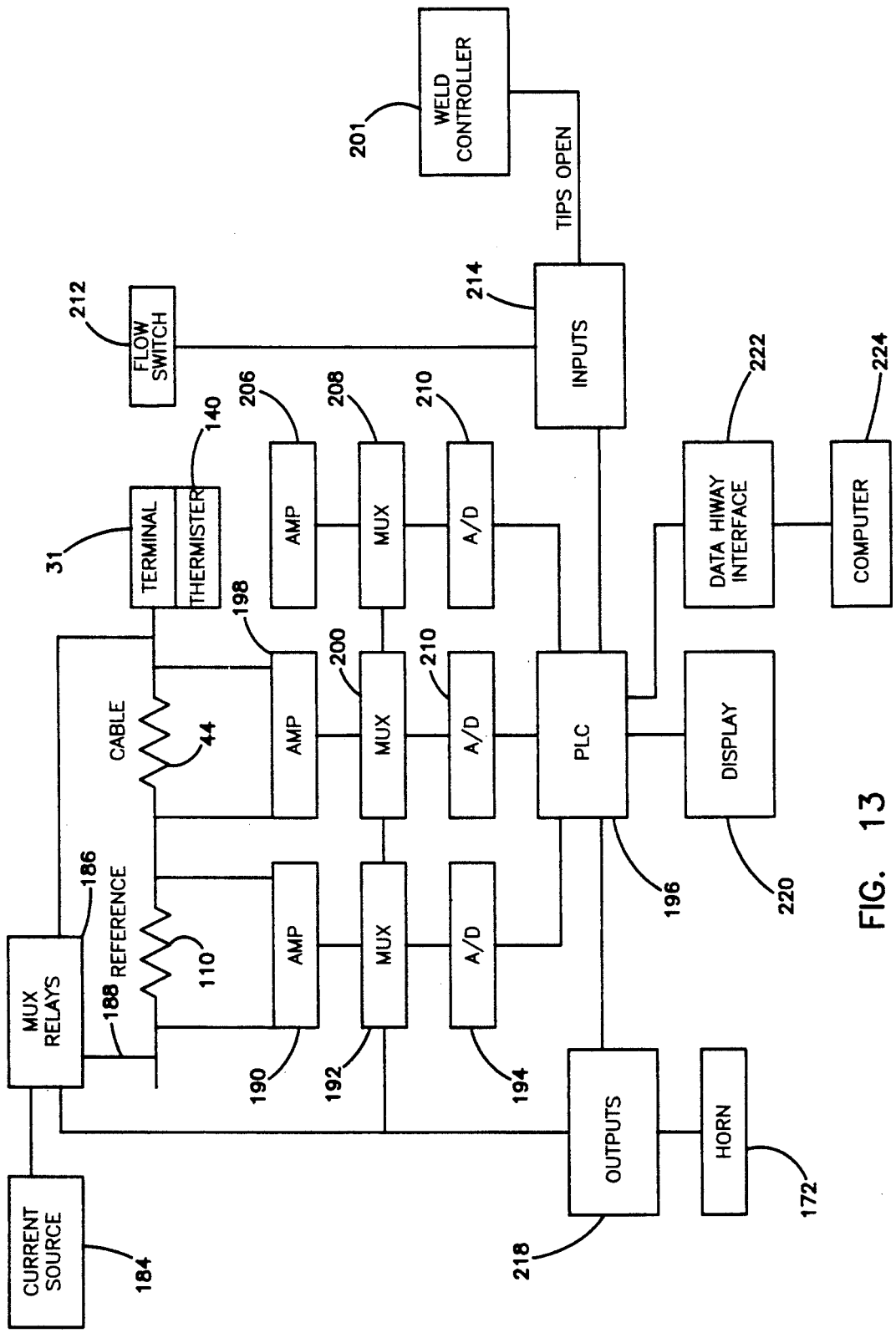
FIG. 13 is a block diagram of the electronic circuitry of the present invention.

A schematic block diagram of the electrical circuitry for a single pair of welding tips is shown in FIG. 13. In this figure, the circuitry used for connecting a large number of welding machines in a single computer circuit are shown. This circuitry employs multiplexing circuitry to sample cable resistance and thermistor values at desired intervals so that a single computer can sort and process the data. As shown in FIG. 13, current source 184 is connected to the individual cables through multiplex relays 186. The relays determine which cable test signals are to be sampled. The current source then is connected by lead 188 through reference resistor 110 and conductors 44 of cable 14 and their inherent resistance.

The output voltage from the reference resistor is amplified by an amplifier 190 and is then directed to multiplexer 192. When sampled by the multiplexer, the signal is converted from an analog to a digital signal in A/D convertor 194 and then is fed to PLC 196.

Similarly, the output signal representative of the voltage drop across the cable is amplified by amplifier 198, directed to a multiplexer 200, and, when sampled, is converted by A/D convertor 202 to a digital signal and fed to PLC 196. A thermistor 140 is mounted on the terminal 31 at the transformer end of the cable 14. The thermistor signal is amplified in amplifier 206 and fed through multiplexer 208 and A/D convertor 210 to PLC 196.

A separate flow switch 212 connected in the water supply conduit for the cable assembly produces an output signal indicating if water is flowing through the conduit. The flow switch output is connected to input module 214, which in turn is connected to PLC 196.

Another input to the PLC is provided by the weld controller 201. In a conventional resistance welder, a weld controller produces a signal indicating that the welding tips are closed or open. This signal from the weld controller is used in the monitoring apparatus of the present invention to trigger the multiplexer to sample the test voltages across the reference resistor and the cable and to read the thermistor after the welding tips open.

The weld controller tips open signal is transmitted to the input module 214 and is then transmitted to the PLC 196.

When the PLC 196 receives a tips open signal, it generates an output signal to output module 218. The output module transmits an actuation signal to the multiplexer ("mux") relay 186. The multiplexer relay will cause a sample to be taken of the voltage drops across the reference and cable resistances when the weld controller indicates that the tips have opened. This signal is transmitted to the PLC and is available on a display 220. The PLC also processes the data to provide a calculated ratio between the reference resistance and the cable resistance. The PLC will be pre-programmed with a threshold resistance increase that will call for the replacement of the cable. The PLC will automatically calculate this increase as each reading is taken and will transmit an alarm signal to the output and then to the horn 172 when the cable needs replacement. A warning light or other signal could also be generated.

The system also includes means for adapting to a wide range of measured values of cable resistances. While a reference resistor is generally in the range of 50 micro ohms, the resistance of different cables can vary between 50 and 1800 micro ohms. A programmable op amp associated with the multiplexer automatically handles these range variations. The op amp has automatically selectable gain levels of 1, 2, 4, and 8. These gains, when combined with the gains of the feed circuit amps, which are about seven, yield overall gains of 7, 14, 28, and 56. A subroutine of the software automatically adjusts the gain of the op am so the system can handle the wide range of cable resistance levels that can be present in the system.

The thermistor and flow switch signals also can be used directly by the PLC to indicate an alarm situation if the actual temperature of the cable becomes too hot or if the coolant flow drops below a predetermined level. In such a case, an output signal to the horn can be generated.

Another useful purpose for the present invention is to provide a means for supplying the manufacturing operation with data about the operation of the resistance welding machine. In its ordinary use, the machine generates a separate signal each time the welding machine cycles. This information, as well as the information about the temperature of the cable, the coolant flow in the cable, and the change in resistance of the cable through use, can be transmitted through a data highway interface 222 to a general purpose computer 224 for plant wide data acquisition purposes.

The foregoing description for the most part is related to a single resistance welding machine and a single cable. With the multiplex arrangement, however, a single PLC can be used to sample output data from several resistance welding cables, and multiple PLCs can be used for providing data from even more cables. A plant having a hundred or more resistance welding machines can be connected in a single network using the present invention and multiplexer circuitry to provide input data on performance of all of the cables and to process this data with a single general purpose computer.

The foregoing is representative of an exemplary embodiment of the present invention. Various modifications may be made in this embodiment within the scope of the present invention, as defined in the appended claims.

I claim:

1. In a resistance welding cable assembly comprising a cable having terminals affixed to opposite ends thereof, the terminals serving as a means for connecting the cable between a current source and a resistance welding gun, the cable assembly being fluid cooled by means of a fluid that flows through an internal passage in the terminals and along the cable within a fluid tight jacket on the cable, the improvement wherein a reference resistor is connected to the cable at a position wherein the reference resistor is in thermal communication with the cable and is affected by the temperature of the cable such that the temperature of the reference resistor is representative of the temperature of the cable, the reference resistor and cable being connected in electrical circuit means for measuring and comparing relative changes in resistance of the reference resistor and cable, the electrical circuit means determining by comparing relative changes in resistance in the reference resistor and cable, the relative increase in resistance of the cable excluding variations in resistance due to cable temperature, communication means receiving the electrical circuit means output and providing a detectable output signal at least when the relative cable resistance increases by a predetermined amount indicative of the need to change cables, the electrical circuit means being capable of measuring and comparing data without disconnecting the cable from the welding apparatus.

2. A cable assembly for a resistance welding machine according to claim 1 wherein the cable assembly comprises an elongated cable having positive and negative conductors and a terminal at at least one end of the cable, the terminal having a pair of electrically isolated conductive sections that are fastened together with an insulator between the sections, the reference resistor being mounted inside the terminal between the insulator and one of the terminal sections, the reference resistor having one end in electrical contact with the adjacent terminal section, the reference resistor being positioned such that the temperature of the reference resistor reflects the temperature of the cable, the electrical circuit measuring the relative resistance of the reference resistor and cable while the reference resistor is inside the terminal and during a time when the welding machine is operating.

3. A cable assembly according to claim 2 wherein the reference resistor and cable are connected in series across a common power supply, the electrical circuit means detecting voltage across the reference resistor and cable and determining the relative changes in cable resistance by comparing relative change in the ratio between cable resistance and reference resistance.

4. A cable assembly according to claim 3 wherein the cable is fluid cooled, with the fluid also cooling the terminals, the reference resistor being sufficiently close to the cooling fluid that the temperature of the reference resistor remains approximately the same as the cooled cable.

5. A cable assembly according to claim 1 wherein the electrical circuit means measures the resistances each time the welding machine cycles.

6. A cable assembly according to claim 1 wherein the electrical circuit means measures the resistances each time after the welding tips open.

7. A cable assembly according to claim 1 wherein the measured data from the welding cable is transmitted to a computer for processing, the computer performing calculations on the data to indicate when the cable should be changed.

8. A cable assembly according to claim 7 wherein the data from multiple cable assemblies is transmitted to a single computer, with multiplexer means sampling the data from each unit and transmitting the data to the computer each time the welding gun is cycled, a weld controller for the welding machine transmitting a signal to the computer each time the welding machine is cycled and the computer in response causing the multiplexer means to sample the resistance data from the cable assembly.

9. A method for measuring the relative change in resistance of a resistance welding cable without disconnecting the cable comprising:
   connecting a reference resistor in series with the cable assembly, with the reference resistor being connected in thermal communication with the cable in such a way that the temperature of the reference resistor is affected by and representative of the temperature of the cable;
   measuring the relative resistance of the cable and reference resistor at least periodically during the life of the cable;
   comparing the resistances as a base value and comparing subsequent changes in the relationship between the resistances with regard to the base value to determine the relative increase in resistance of the cable over the period of use of the cable, the increase in relative resistance of the cable being used to determine when the cable should be replaced, the periodic measurements being conducted without disconnecting the cable assembly from the resistance welding apparatus.

* * * * *